No. 853,323. PATENTED MAY 14, 1907.
J. E. SCOTT.
BAKE OVEN.
APPLICATION FILED APR. 30, 1906.
3 SHEETS—SHEET 1.
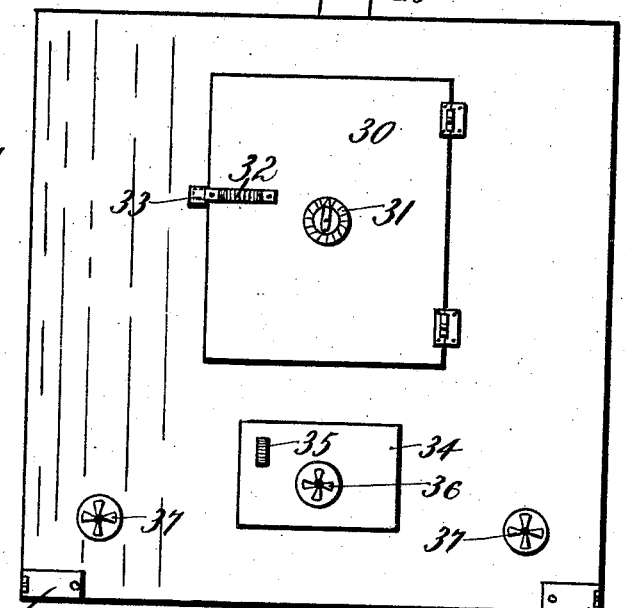
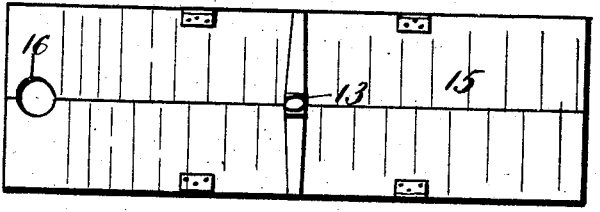
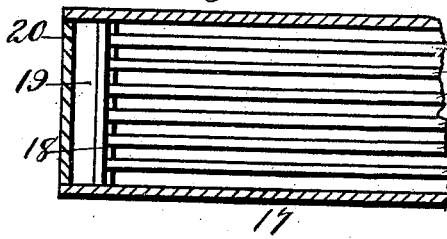
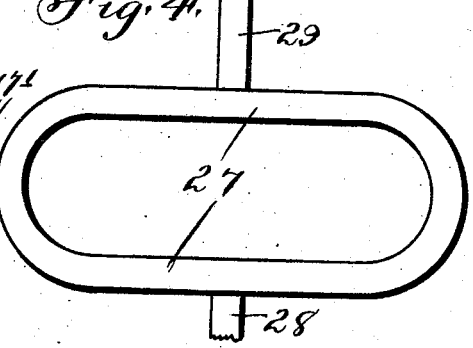
Witnesses
J. P. Duffie
Belle C. Trott
Inventor
James E. Scott
By John S. Duffie
His Attorney No. 853,323. PATENTED MAY 14, 1907.
J. E. SCOTT.
BAKE OVEN.
APPLICATION FILED APR. 30, 1906.

3 SHEETS—SHEET 2.

Witnesses
J. P. Duffie
Belle C. Trott

Inventor
James E. Scott
By John S. Duffie
His Attorney

THE NORRIS PETERS CO., WASHINGTON, D. C.

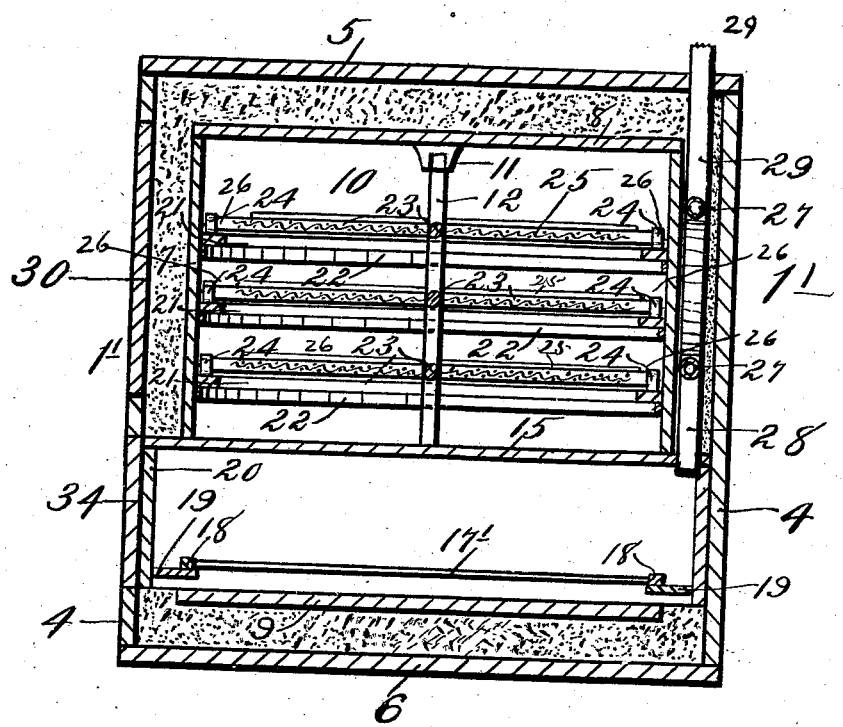

UNITED STATES PATENT OFFICE.

JAMES E. SCOTT, OF RUGBY, NORTH DAKOTA.

BAKE-OVEN.

No. 853,323.  Specification of Letters Patent.  Patented May 14, 1907.

Application filed April 30, 1906. Serial No. 314,500.

*To all whom it may concern:*

Be it known that I, JAMES ELMER SCOTT, a citizen of the United States, residing at Rugby, in the county of Pierce and State of North Dakota, have invented certain new and useful Improvements in Bake-Ovens, of which the following is a specification.

My invention has relation to new and useful improvements in bake ovens, and has for its object the production of an oven of improved and simplified construction which shall afford a maximum capacity for baking purposes with a minimum of fuel consumption, and in which there is a uniform distribution of heat, so that the baking is effected in a thorough and uniform manner, said oven being of such construction as to enable the loaves or other articles to be baked to be placed in and removed therefrom in a convenient and easy manner.

With these ends in view my invention consists in the novel construction, combination, and arrangements of parts as set forth in the specification and claims hereunto attached.

Figure 5:
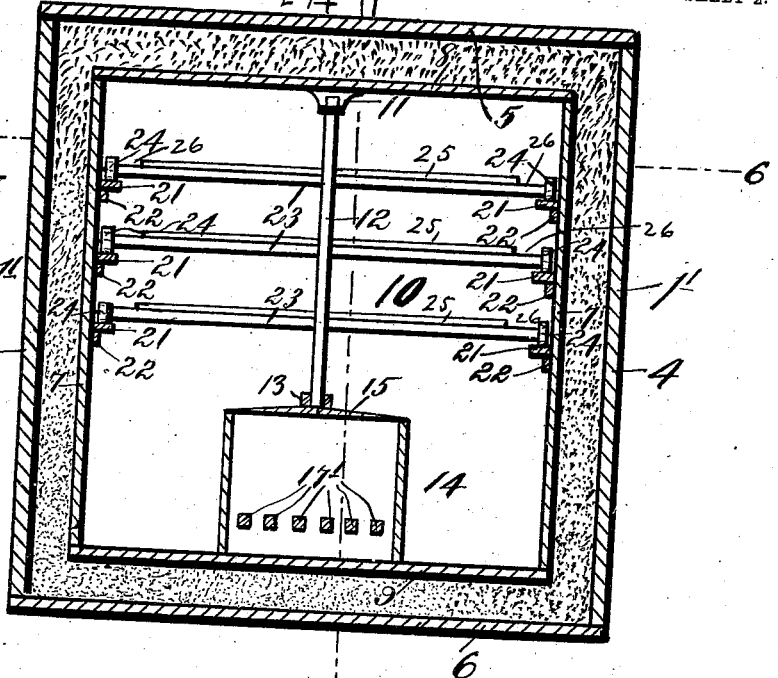
Figure 6:
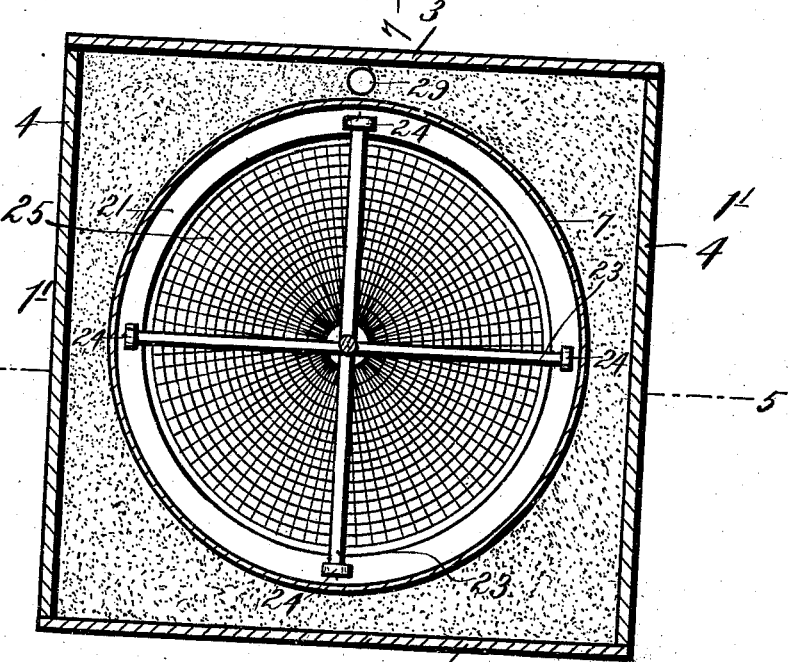

In the accompanying drawings in which like parts are designated by like characters throughout the several views:—Figure 1, is a front elevation of my improved oven. Fig. 2, is a top plan view of the fire box. Fig. 3, is a horizontal sectional view of the fire box above the grate, with one end broken away. Fig. 4, is a side elevation of a construction of heat flue I employ. Fig. 5, is a vertical transverse sectional view of my invention, cut on the line 5 5, of Fig. 6. Fig. 6, is a transverse sectional view of my invention, cut on the line 6 6 of Fig. 5. Fig. 7, is a vertical transverse sectional view of my invention, cut on the line 7 7, of Fig. 5.

My invention is described as follows:—

Fig. 1 is a front view of my improved oven, which is preferably constructed with an outer square casing $1^1$, having a front wall 2, rear wall 3, and side walls 4, top 5 and bottom 6. Located centrally in said square casing $1^1$, is a circular vertical jacket or wall 7, having a top 8 and bottom 9, providing a baking chamber 10. A support 11, is rigidly secured to the under face and center of the top 8 of said circular vertical jacket or wall 7, and rotatably and vertically supported from said support, is a central vertical shaft 12, the lower end of which works in a bearing 13, located at the intersection of the longitudinal and transverse centers of the cover of a fire box 14. This fire box is preferably provided with a folding cover 15, which consists of two longitudinal rectangular oblong parts, hinged to the side walls of said fire box; said box is provided at its rear end with a circular perforation 16. A grate 17, consisting of a series of longitudinal bars 17', secured at their ends to transverse bars 18, which rest on transverse supporting plates 19, secured to and extending inwardly from the end walls 20 of the fire box 14, is removably secured in said fire box. The amount of longitudinal movement that the said grate 17 is susceptible of, depends on the construction of the supporting plates 19. Rigidly secured in any suitable manner to the inner periphery of said circular wall or jacket 7, is a plurality of horizontal circular tracks 21, having downwardly extending vertical flanges 22. These tracks may be of such a number, and such distances apart as is found convenient and desirable in the construction and use of my oven. Secured midway of their lengths to said central vertical shaft 12, are horizontal shafts 23, which are provided at their extreme outer ends with wheels 24, which are adapted to travel on the tracks 21. Circular horizontal shelves 25 are secured to said shafts 23 so that when said shafts are revolving about their axis, the said shelves will also revolve. These shelves may be made of solid or grated material. Experience has shown that where both solid and grated shelves are used, it is better to have the grated shelves nearest the top 8 of the circular wall of jacket 7, or, in other words, above the solid shelves. When grated shelves are used I employ circular horizontal plates, which are secured at their centers to said vertical shaft 12, and the inner parts of the grated shelves are secured to these plates at or near their peripheries. A space 26, is left between the said tracks 21 and the peripheries of said shelves 25, so that the heat produced by the combustion of the fuel in the fire place will circulate more uniformly and produce better results. Sand or other suitable material is placed between the circular wall or jacket 7, and the vertical walls 2, 3, and 4 of said square casing $1^1$, and between the tops and bottoms of said square casing $1^1$ and circular wall 7, which sand or other suitable material increases the heat retaining quality of the oven. To render the distribution of the heat in my oven still more uniform and to attain better results than could be otherwise accomplished, I employ a link shaped flue 27, having vertical flue pipes 28 and 29. When in use, the said flue 27 is placed in the oven between the rear wall 3 of said square casing $1^1$ and the circular jacket 7, and the pipe 28, secured at its lower end in the vertical circular perforation 16 of said fire box cover 15. The pipe 29 passes vertically upward through the sand and out of the top of the oven.

The front wall 2, of my oven, is provided with an oven door 30, heat gage 31, and a handle 32, which terminates at one end in a tongue which is received by a catch 33 when the door is closed. The fire door 34, provided with a handle 35, and air vent 36, is hinged to said wall below said door 30. Said wall is also provided near each lower corner with an air vent 37. If so desired, the sand may be removed from the said oven by means of sand doors 38, one located at each lower corner of said wall 2.

Having described my invention, what I claim as new and desire to secure by Letters Patent, is:—

1. In an oven, the combination of an outer casing $1^1$, having a front wall 2, rear wall 3, side walls 4, top 5 and bottom 6; vertical circular wall 7, having top 8 and a bottom 9, centrally located in said outer casing $1^1$, and providing a baking chamber 10; circular horizontal tracks 21, having downwardly extending vertical flanges 22, secured to the inner periphery of said wall 7; a support 11, secured to the under face of the top 8 of said wall 7; central vertical shaft 12, rotatably supported from said support, and journaled in bearing 13; horizontal shafts 23, secured at their longitudinal centers to said shaft 12, and extending across the baking chamber 10; wheels 24, journaled on the ends of said shafts 23; horizontal circular shelves 25, secured to said shafts 23, their peripheries being some horizontal distance from said tracks 21, leaving a space 26 for the heat to circulate; fire box 14, located in said baking chamber 10, and extending diametrically across the oven; grate 17, located in said fire box; folding cover 15, covering said fire box 14, said box provided in its rear end with a vertical perforation 16; bearing 13, secured to the center of the top of said cover 15, and adapted to receive the free end of said shaft 12; link shaped flue 27, terminating at its ends in vertical parts, located between the rear wall of said outer casing $1^1$ and the circular wall 7, the lower vertical part of said heat flue 27 fitting in the said perforation 16 of said cover 15, with means for gaining access to said oven, substantially as shown and described and for the purposes set forth.

2. A bake oven, consisting of an outer casing; a central, vertical, circular chamber inside of said casing; circular horizontal tracks, secured against the inner face of the wall of said chamber; a support, centrally secured to the under face of the top of said casing; a fire box, located in said casing, and extending across the oven; a grate, located in said fire box; folding covers, covering said fire box, said box provided at its rear end with a vertical perforation, and at its center with a bearing; a vertical shaft, journaled in said support and said bearing; horizontal shafts, secured at their longitudinal centers to said vertical shaft, and extending to said tracks; wheels, journaled on the ends of said shafts, and running on said tracks; circular shelves, secured to said horizontal shafts, their peripheries not reaching quite to said tracks; a link shaped flue, terminating at its ends in vertical pipes, located between the outer casing and said chamber, the lower pipe fitting in the perforation in said box, and the upper pipe passing up through said outer casing; sand, filling in the space between said outer casing and central chamber, and doors in the lower part of said outer casing to permit the removal of said sand, said oven having proper doors providing ingress to said baking chamber, substantially as shown and described and for the purposes set forth.

3. A bake oven, consisting of an outer casing; a central vertical circular chamber inside of said casing; circular horizontal tracks secured against the inner face of the wall of the said chamber; a support, centrally secured to the under face of the top of said casing; a fire box, located in said casing, and extending across the oven; a grate, located in said fire box; folding covers, covering said fire box, said box provided at its rear end with a vertical perforation, and at its center with a bearing; a vertical shaft, journaled in said support and said bearing; horizontal shafts, secured at their longitudinal centers to said vertical shaft, and extending to said tracks; wheels, journaled on the ends of said shafts, and running on said tracks; circular shelves, secured to said horizontal shafts, their peripheries not reaching quite to said tracks; a link shaped flue, terminating at its ends in vertical pipes, located between the outer casing and said chamber, the lower pipe fitting in the perforation in said box, and the upper pipe passing up through said outer casing, and sand, filling in the space between said outer casing and central chamber, said oven provided with doors for the removal of the sand and for ingress to said oven, substantially as shown and described and for the purposes set forth.

In testimony whereof I have signed my name to this specification in the presence of two subscribing witnesses.

JAMES E. SCOTT.

Witnesses:
  B. L. SHUMAN,
  SIMON WESTBY.